US007749075B2

(12) United States Patent
Byng

(10) Patent No.: US 7,749,075 B2
(45) Date of Patent: Jul. 6, 2010

(54) RESIDUAL CREDITS IN A GAMING SYSTEM

(75) Inventor: Stephen William Byng, New South Wales (AU)

(73) Assignee: Aristocrat Technologies Australia Pty, Ltd. (AU)

( * ) Notice: Subject to any disclaimer, the term of this patent is extended or adjusted under 35 U.S.C. 154(b) by 1255 days.

(21) Appl. No.: 10/825,698

(22) Filed: Apr. 15, 2004

(65) Prior Publication Data

US 2004/0266522 A1 Dec. 30, 2004

(30) Foreign Application Priority Data

Apr. 15, 2003 (AU) .............................. 2003901807

(51) Int. Cl.
*A63F 13/00* (2006.01)

(52) U.S. Cl. ............................ 463/25; 463/26; 463/27; 463/42

(58) Field of Classification Search ............. 463/25–27, 463/42
See application file for complete search history.

(56) References Cited

U.S. PATENT DOCUMENTS 6,589,115 B2 * 7/2003 Walker et al. ................. 463/25
6,702,673 B2 * 3/2004 Webb .......................... 463/25
6,966,834 B1 * 11/2005 Johnson ....................... 463/25

* cited by examiner

*Primary Examiner*—Dmitry Suhol
*Assistant Examiner*—Andrew Kim
(74) *Attorney, Agent, or Firm*—McAndrews, Held & Malloy, Ltd.

(57) ABSTRACT

A system for enabling a player to use residual credits on a gaming machine to provide the player with a chance to win a prize. the system includes means for determining a range of values as a function of a jackpot pool to generate randomly an outcome in the range of values, random number generation means for generating the random outcome, means for determining a range of outcome values of the player that provides a chance of the player winning the jackpot pool, and means for determining whether the generated random outcome matches any outcome value of the player.

13 Claims, 5 Drawing Sheets

RESIDUAL CREDITS IN A GAMING SYSTEM

PRIORITY INFORMATION

This application claims priority benefits of Australian Provisional Application No. 2003901807 filed Apr. 15, 2003 entitled, "Residual Credits in a Gaming System," the content of which is incorporated herein by reference.

FIELD OF THE INVENTION

This invention relates to a system and method for using residual credits derived from a gaming system for the chance to win a prize where the residual credits are otherwise not collectable by a user or player.

BACKGROUND TO THE INVENTION

Where gaming systems and more particularly gaming machines dispense a unit of monetary value that is more than the present residual credit on the machine owing to the player, there is no method or system to enable that player to acquire a monetary value equivalent to the credit. In such situations the player may have decided to stop playing on a particular machine and has a residual amount of credit that is unable to be presented or resolved as a whole credit.

Known prior art systems include double up features, residual credit removal features, CDS tokeniser applications, hyperlink jackpots, stand alone jackpots and link progressive jackpots.

The present invention seeks to overcome these problems by providing the player with an opportunity to risk the residual amount of credit in exchange for the possibility of a significant gain or prize.

SUMMARY OF THE INVENTION

According to a first aspect of the invention there is provided a method of using a residual credit of a player of a gaming machine to enable the player to win a prize, the method comprising the steps of:

deriving a value of a jackpot pool;

determining a range of values as a function of the size of the jackpot pool;

using the range of values to generate randomly an outcome in the range of values;

determining a range of outcome values of the player that provides a chance of the player winning the jackpot pool;

generating the outcome; and determining whether the generated outcome matches any of the outcome values of the player.

Preferably where the generated outcome matches an outcome value of the player, the jackpot pool is awarded to the player. An upper limit of the range of values from which an outcome is generated randomly is preferably the value of the jackpot pool divided by the denomination of the gaming machine.

Preferably the outcome values of the player are determined on the basis of the residual credit of the player and the denomination of the gaming machine. Preferably the jackpot pool is defined by an upper limit and comprises contributions of residual credit from a plurality of players of gaming machines, such that the jackpot pool accumulates up to the upper limit.

Preferably the number of outcome values provided to a player is equal to the residual credit of the player divided by the denomination of the gaming machine. The current value of the jackpot pool may determine the number and outcome values of the player when the player offers their residual credit. The player may be assigned a unique identification which is stored in storage means together with the outcome values of the player. Preferably more than one outcome is generated randomly and each generated outcome is compared to any outcome values of the player or players. Where more than one outcome value is allocated to a player these outcome values may be sequential in number.

According to a second aspect of the invention there is provided a system for enabling a player to use residual credits on a gaming machine to provide the player with a chance to win a prize, the system comprising:

means for determining a range of values as a function of a jackpot pool to generate randomly an outcome in the range of values;

random number generation means for generating the random outcome;

means for determining a range of outcome values of the player that provides a chance of the player winning the jackpot pool; and means for determining whether the generated random outcome matches any outcome value of the player.

The means for determining a range of values preferably calculates an upper limit for the range by dividing the jackpot value by the denomination of the gaming machine. The means for determining a range of outcome values preferably calculates the outcome values by dividing the residual credit of the player by the denomination of the gaming machine.

A plurality of players may use their residual credits to contribute to the jackpot pool, the jackpot pool being set at a specified amount or upper limit. Preferably the jackpot pool accumulates to the specified amount or upper limit as more players contribute their residual credits to the jackpot pool.

Preferably the current value of the jackpot pool determines the number of and outcome values of a player who has offered their residual credit. The system may further comprise storage means for storing the outcome values of each player and a unique identification identifying each player.

BRIEF DESCRIPTION OF THE DRAWINGS

Preferred embodiments of the invention will hereinafter be described, by way of example only, with reference to the accompanying drawings wherein.

DETAILED DESCRIPTION OF THE PREFERRED EMBODIMENTS

Players of gaming machines are allowed to risk residual credits, where a particular gaming system or gaming machine is unable to dispense units of monetary value equivalent to the residual credit. In return for that risk the player is given the chance to win a prize of some significance, such as a jackpot pool. Sources of the prizes of a residual credit jackpot which the player undertakes may be jackpots or other prizes.

There are two basic types of residual credit jackpots being instant resolution and delayed resolution both of which will be described in further detail below.

A player that completes the gambling games and has credits remaining within the gaming system, but which are insufficient to collect as a whole credit may be offered a range of options to use or deal with the remaining or residual credit. The player may continue playing the particular gaming machine until enough credit is raised or realised to enable the machine to pay out units of monetary value that are equivalent to or achieve as much credit owing to the player. Alternatively, as in the present invention the player can select a residual credit jackpot redemption feature. The residual credit triggers a prize based on one of the three scenarios which are outlined in the following description.

Firstly, where the residual jackpot is an instant resolution, the residual stake of the player is calculated as a percentage of the possible prize or prizes, such as a jackpot pool. This is the percentage chance that the residual stake results in winning. A random number is then generated and if this number is less than or equal to the percentage chance to win then an appropriate prize is awarded to the player.

Figure 1:
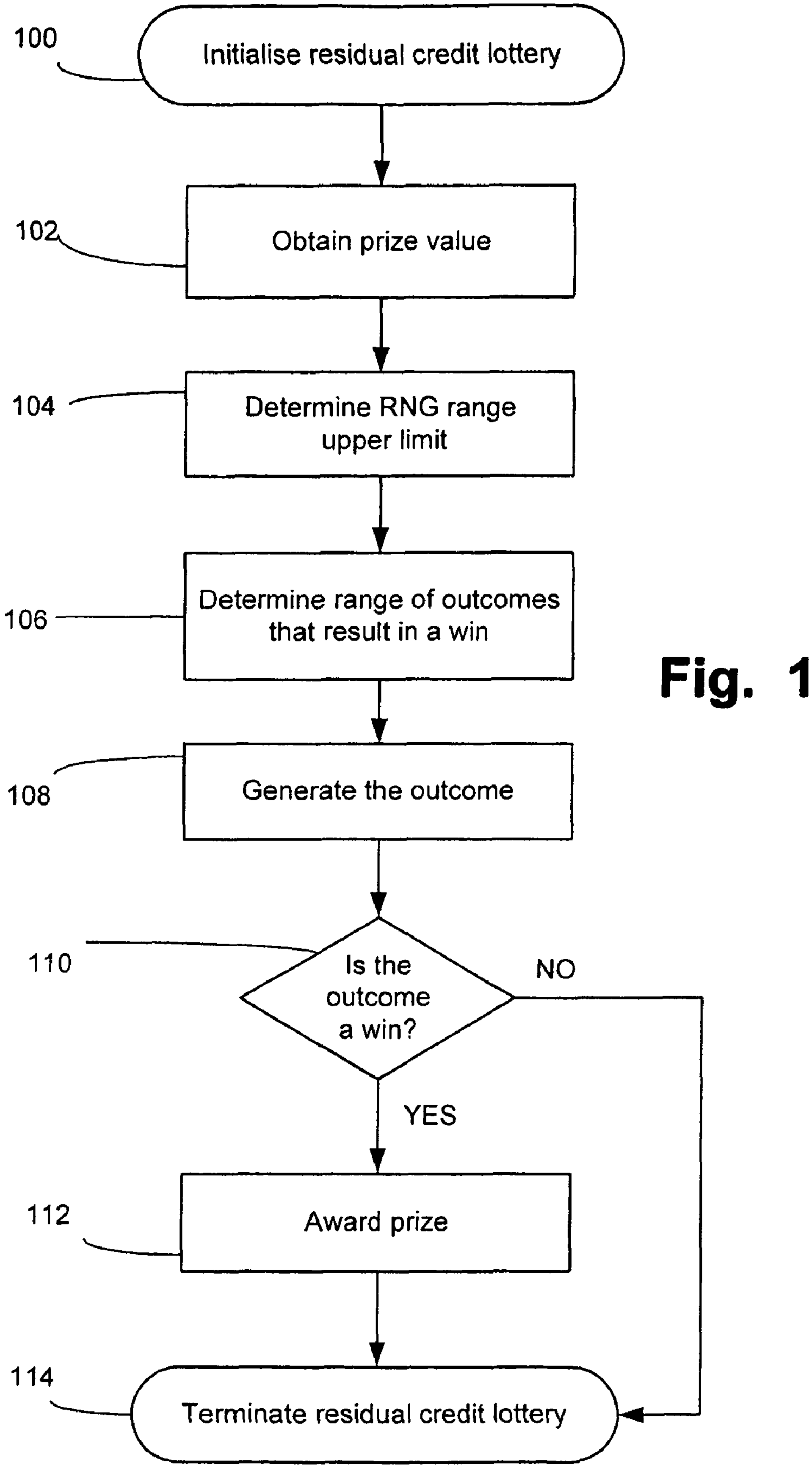
FIG. 1 is a flow diagram showing processes involved with a residual credit jackpot using an instant resolution type.

Referring to the instant resolution in further detail with reference to FIG. 1 at step 100, the residual credit lottery system is initialised and then at step 102 a prize value is obtained. At step 104 the upper limit of the random number generator range is determined whereby the limit of the range is equivalent to the prize divided by the denomination. The process moves to step 106 where a determination is made of the range of outcomes that would result in a win. Thus the winning range upper limit would equal the residual credit divided by the denomination. The process then moves to step 108 where an outcome is generated from the random number generator and a decision is made at step 110 as to whether the outcome has resulted in a win. In other words, if the outcome is a value between 1 and the winning range upper limit, then a prize is awarded at step 112 and the residual credit lottery is terminated at step 114. If the outcome is not a win, then the process moves to step 114 where the residual credit lottery is terminated.

As an example of how the above flow chart works and how the instant resolution is determined, a player may have 50 cents remaining for a system that dispenses dollar coins only. The denomination of the system is 10 cents. The player is offered a selection of residual credit resolution options of which the player selects residual credit jackpot redemption. The single prize award is $1,000 so that the player has a five in ten thousand chance of winning the $1,000 prize. This has been determined by the fact that the player has 50 cents remaining and the prize is $1,000. The upper range of the random number generation outcome is determined by the prize divided by the denomination which is equivalent to 1,000 divided by 0.10 equal to 10,000. Thus the total range of the random number generation is $1 \geqq \text{outcome} \geqq 10{,}000$. The winning range is determined to have an upper limit equivalent to the residual credit which is 50 cents divided by the denomination of 10 cents which gives the result of 5. Therefore, if the outcome is any one of the numerals 1 to 5, then the player will win the prize of $1,000.

Figure 2:
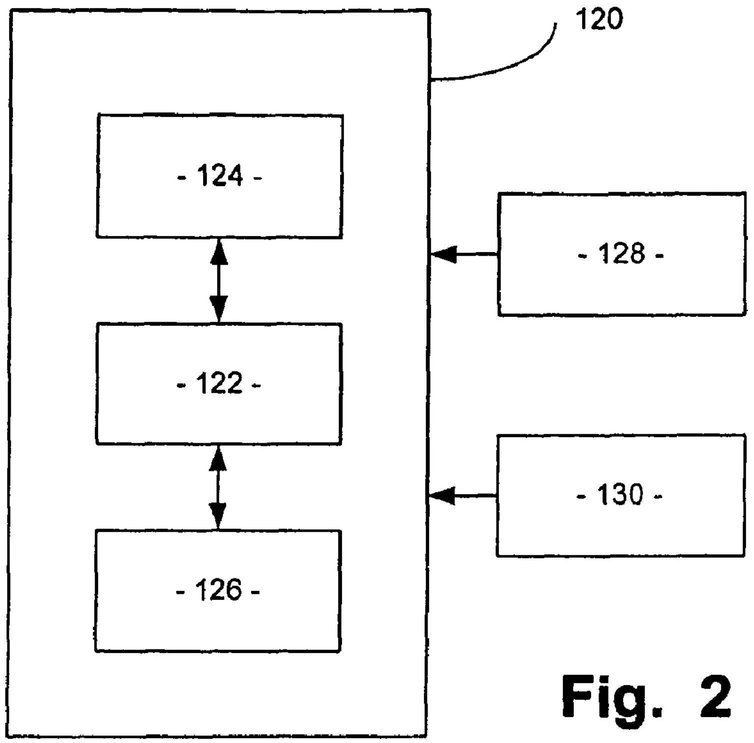
FIG. 2 illustrates a schematic diagram of components of a game machine to enable a prize allocation to a player or players using residual credits.

Shown in FIG. 2 is a controller 120 that forms part of the game machine having a processor 122, data storage means 124 and memory means 126. Linked to the controller 120 is a mechanism 128 that inputs pulses to the controller 120 to indicate that the player has provided sufficient credit in playing. The controller 120 preferably drives a video display screen (not shown) and receives input signals from sensors to determine actions of the player. The controller 120 further drives a payout mechanism (not shown) which for example may be a coin output. Also provided is a random number generator 130 which is input to the controller 120. The processor 122 specifically determines an upper limit for the random number generating range according to step 104 in FIG. 1 and already has inputs from the mechanism 128 to determine the amount of credit remaining for a player and will also from the memory 126 have access to the denomination of the gaming system or machine. Therefore various player outcomes can be set up and calculated knowing the residual credit and denomination. Once the random number generator 130 generates a number or an outcome this is then compared by the processor to the outcomes of the player. If a match is determined then a prize is awarded to the player. Computer programs that implement a game and game features are stored in memory 126 and runs on a standard gaming console control processor which may be processor 122.

Another possible type of residual credit jackpot is that of delayed resolution. In this scenario a residual stake of the player is stored along with residual stakes of other players. The means of associating the ownership of the stake to an individual or a group is also stored along with the respective residual stake. The residual stakes are accumulated until the total of the residual stakes is equal in value to the total of all prizes. Each residual individual stake then represents a finite portion of the prize and also represents a percentage chance to win a prize. A random number is then generated by a random number generator and if the number falls into the finite segment that represents a specific stake of a player, then that stake is determined as winning a prize and the player is accordingly awarded a prize.

Figure 3:
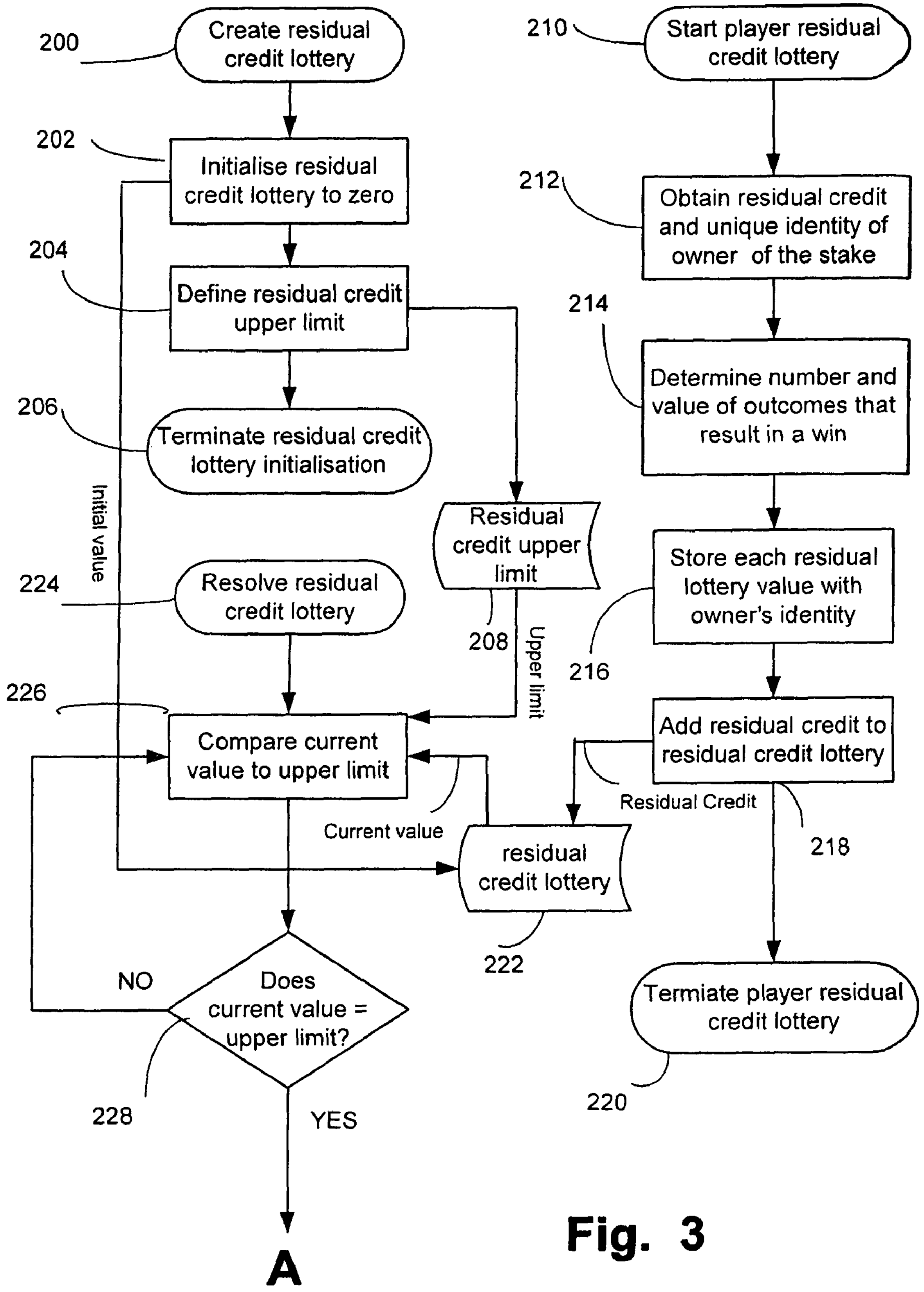
FIG. 3 is a flow diagram showing processes involved with a delayed residual credit jackpot.
Figure 3:
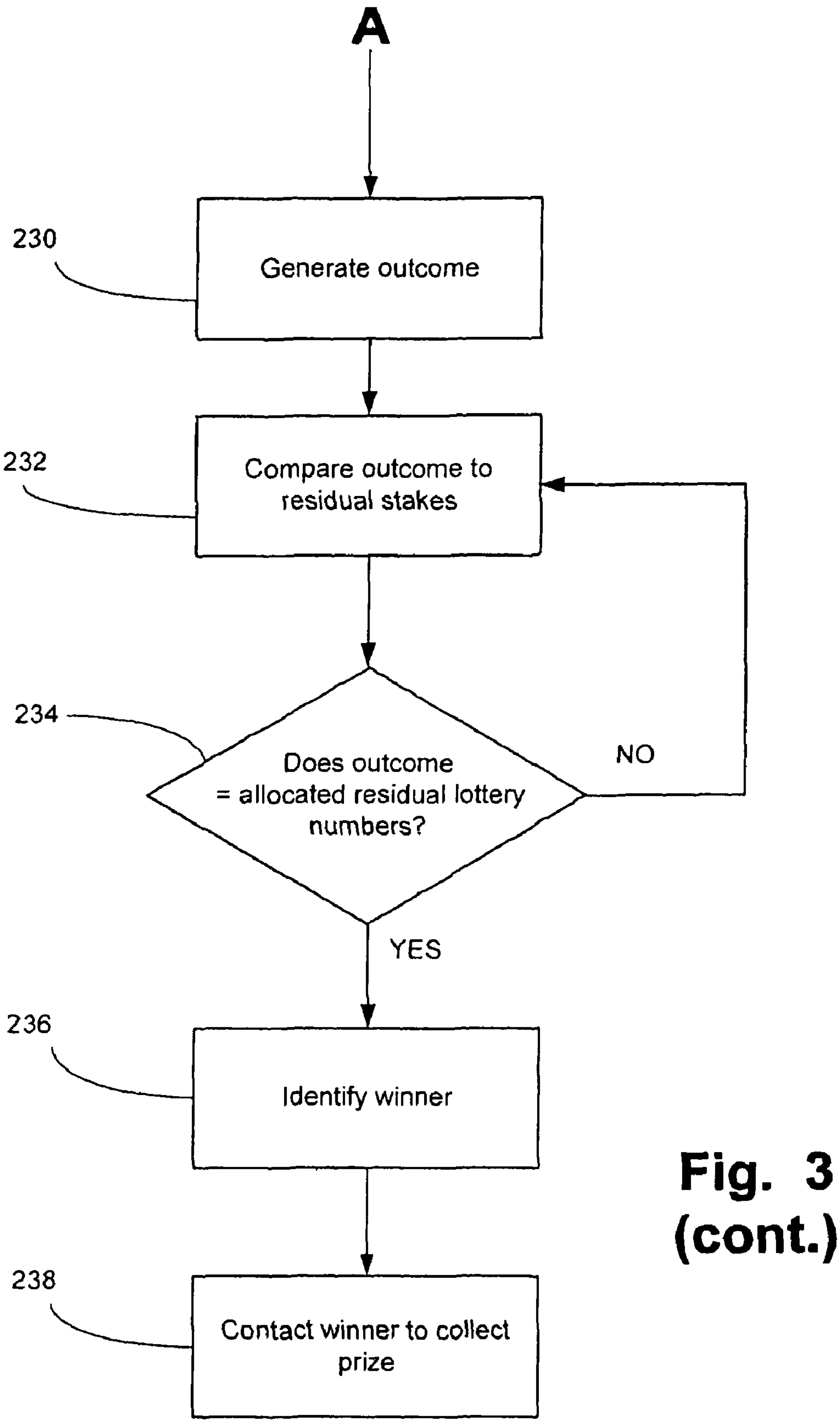

With reference to FIG. 3, the process is described and shown in more detail. Firstly, at step 200 the residual credit lottery is created and at step 202 the residual credit lottery is initialised to zero and this initial value is then stored in a storage module 222 (or equivalently 308) for the residual credit lottery. At step 204, a residual credit upper limit is defined being the prize divided by the denomination. Then at step 206 the residual credit lottery initialisation is terminated.

At step 210 the player residual credit lottery is commenced and at step 212 the residual credit and unique identity of the owner of the stake is obtained. The total number of residual lottery numbers allocated to a particular player equals the residual credit divided by the denomination. At step 214 a determination is made as to the number and value of outcomes that results in a win. At step 216 each residual lottery value is stored together with the owner identity in a storage module such as 308. This occurs for all of the players involved in this lottery. At step 218 the residual credit is added to the residual credit lottery in the data storage module 222 (or 308) and at step 220 the player residual credit lottery is terminated.

In order to resolve the residual credit lottery 224, the current value taken from the residual credit lottery data storage module 222 (or 308) is input into a comparator at step 226 which compares that current value to the upper limit of the residual credit derived from step 204. The process then moves to step 228 where a determination is made as to whether the current value equals the upper limit. If not the process reverts to step 226 but if the current value does equal the residual credit upper limit an outcome is generated by the random number generator at step 230. At step 232 the generated outcome is compared to all of the residual stakes. At step 234 a determination is made as to whether the generated outcome equals an allocated residual lottery number or numbers. If not, the process returns to step 232 but if the outcome equals one or more of an allocated residual lottery number then the winner is identified at step 236 and the winner contacted to collect the prize at step 238.

Figure 5:
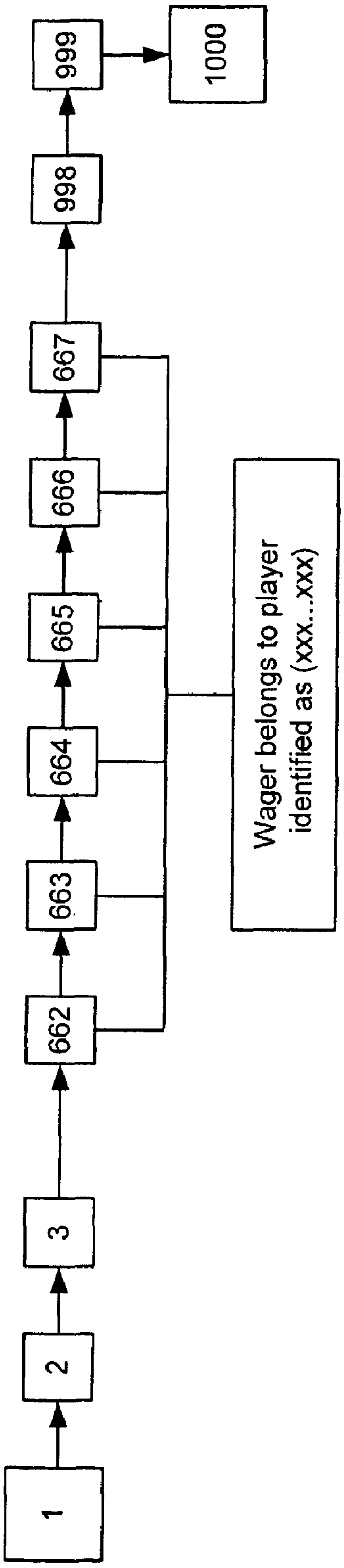
FIG. 5 is a schematic diagram showing a sequential allocation of winning numbers based on the delayed residual credit jackpots.

As an example of the delayed residual credit jackpot scenario the following can be considered. A player has 60 cents remaining in residual credit for a system that dispenses only dollar coins. The denomination of the system is 10 cents. The player is known to the system and identified under an identification code such as (xxx . . . xxx) which is unique to an individual. The total prize is currently worth $66.10 and a single prize award of $100 will be offered that will be resolved when the system accumulates enough residual credit stakes from all of the players when it totals $100. The player is offered a selection of residual credit resolution options of which the player selects residual credit jackpot redemption. The total prize is now worth $66.70 given that 60 cents of that player is added to the current total prize of $66.10. The player identified by (xxx . . . xxx) is allocated the numbers 662, 663, 664, 665, 666 and 667 as the player has a residual credit of 60 cents and the denomination is 10 cents giving the player six numbers so allocated. As the single prize is $100 and the denomination is 10 cents, the upper limit of the range will be 1,000 numbers. The residual credit upper limit is $100 and at step 226 this is compared to the current value of the residual credit lottery formed by the residual amounts of each of the players. Thus in FIG. 5 it is noted that the sequence of numbers from 662 up to 667 as a wager belongs to the player identified as (xxx . . . xxx). Other numbers between 1 and 1,000 and outside of the range 662 to 667 would belong to other players.

Eventually the accumulated prize reaches $100 and the range of the random number generation outcome is determined to be between 1 and 1,000. Any random number generated that falls in the range 662 through to 667 results in the player identified under code (xxx . . . xxx) winning $100.

Figure 6:
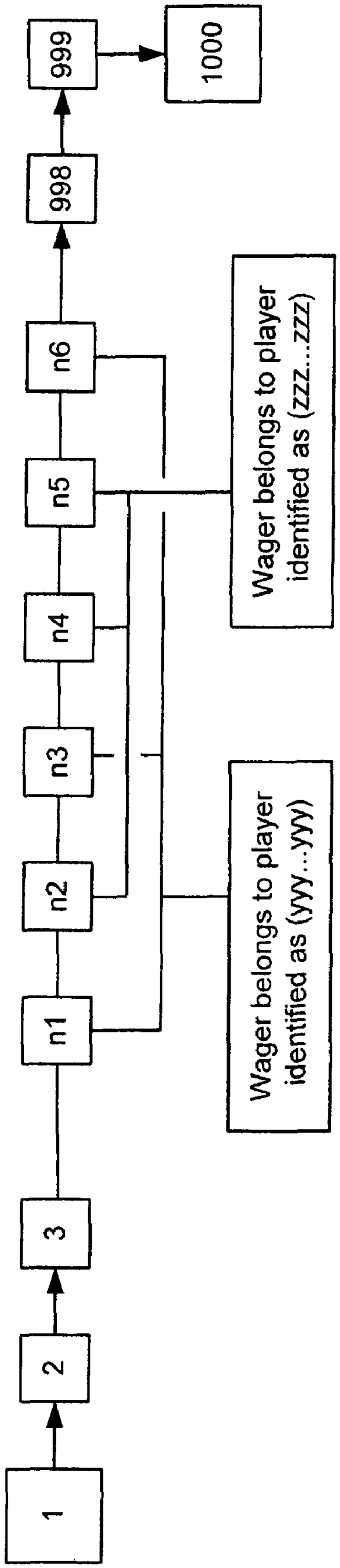
FIG. 6 is a schematic diagram showing a non-sequential allocation of numbers to a player or players using the delayed residual credit jackpot.

Alternatively the numbers allocated to the player need not be sequential as in the above scenario. For example with reference to FIG. 6, out of the 1,000 numbers n1, n3 and n6 may belong to a player identified as (yyy . . . yyy) and numbers identified by n2, n4 and n5 may belong as a total wager to the player identified by (zzz . . . zzz).

Figure 4:
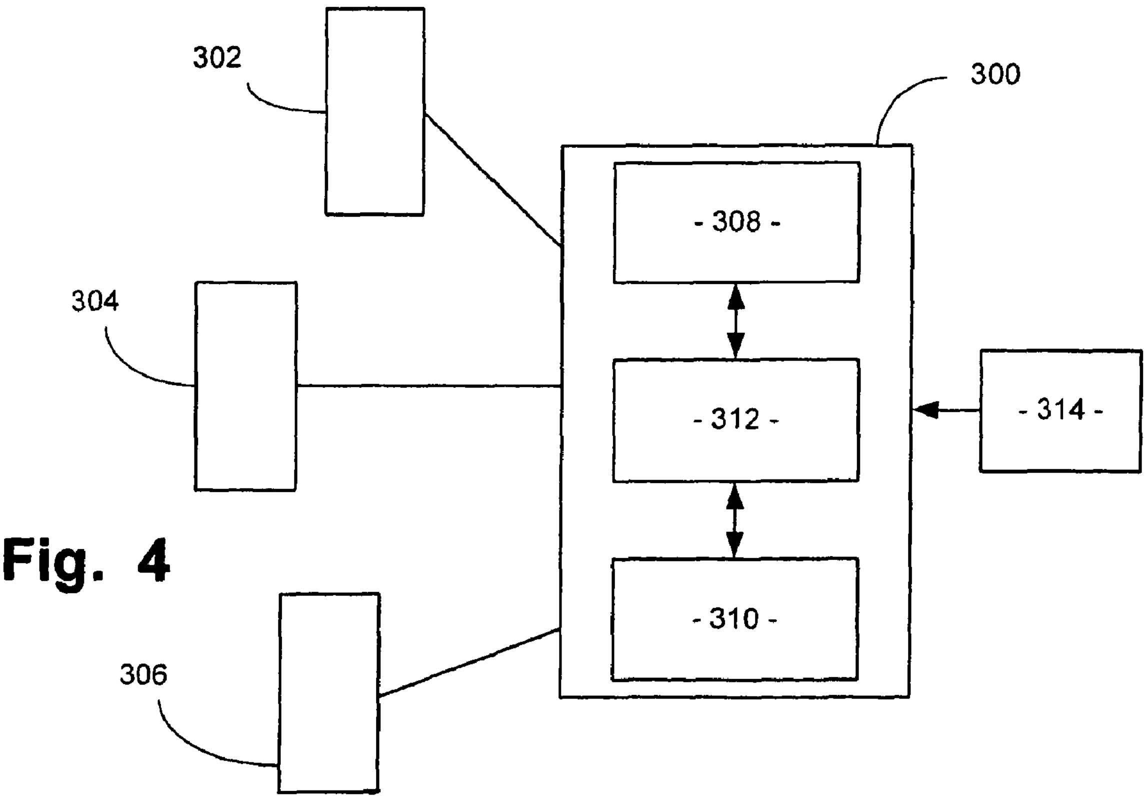
FIG. 4 is a schematic diagram showing an overall gaming system used to allocate a prize to a number of players using the residual credits derived from playing on single game machines linked to a central controller.

Shown in FIG. 4 is an overall game controller 300 that receives inputs from various game machines 302, 304, 306 and any number of other game machines operated on by players. It receives updates from each of the game machines on residual credits that are owing to players which cannot be otherwise paid out to the player, for example due to the coin denomination of the machine. It has a data storage means 308, a memory means 310 and a processor 312 and also receives inputs from a random number generator 314. A prize limit is set and players that opt to add their residual credit to form a cumulative total of the prize are given outcome values based on the current cumulative total of the prize and this is determined by the processor 312 and stored in the data storage means 308. Player identifications are also stored in the data storage means 308 with the outcome values. Once the random number generator 314 generates one or more random outcomes these are compared with the stored player outcomes and any matches are determined by the processor 312 to identify winners.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A method of wagering a residual credit of a gaming machine to win a prize having a prize value, the residual credit being equivalent to units of monetary value which is held within the gaming machine and is indispensable by the gaming machine, the gaming machine using a denomination and having at least one processor, the method comprising:

determining by the at least one processor a range of random numbers as a function of the prize value, said range of random numbers has an upper limit;

determining by the at least one processor at least one winnable outcome value dependent on the value of the residual credit indispensable by the gaming machine, the number of winnable outcome values including an outcome upper limit;

randomly generating by the at least one processor an outcome from the range of random numbers;

comparing by the at least one processor the generated outcome in relation to the winnable outcome value;

awarding the prize from the gaming machine if the generated outcome relationally matches any of the winnable outcome values;

determining by the at least one processor the upper limit by dividing the prize value by the denomination; and determining by the at least one processor the outcome upper limit by dividing the residual credit by the denomination of the gaming machine.

2. The method according to claim 1, further comprising selecting an upper limit of the prize value, the method further comprising receiving contributions from another residual credit another gaming machine until the upper limit of the prize value is reached.

3. The method according to claim 2 wherein the current value of the prize value determines the number of winnable outcome values.

4. The method according to claim 3 further comprising assigning a unique identification code for each contribution of residual credit.

5. The method according to claim 4 further comprising storing the unique identification code and the winnable outcome values.

6. The method according to claim 5, wherein the outcome is a first outcome, the method further comprising:

generating a second outcome; and comparing each of the first and second outcomes to the winnable outcome values.

7. The method according to claim 1, wherein the number of winnable outcome values is sequential in number.

8. A gaming system for wagering residual credits of a gaming machine to win a prize having a prize value, the residual credit being equivalent to units of monetary value which is held within the gaming system and is indispensable by the gaming machine, the gaming machine uses a denomination, the gaming system comprising:

a controller determines a range of random numbers as a function of the prize value and determines at least one winnable outcome value based on the value of the residual credit indispensable by the gaming machine and determines an upper limit for the range of random numbers, the upper limit being the prize value divided by the denomination;

a random number generator generates a random outcome within the range of random numbers; and wherein the controller compares the generated random outcome in relation to the winnable outcome value; and awards the prize from the gaming machine if the generated random outcome relationally matches any of the winnable outcome values and divides the residual credit by the denomination to determine the number of winnable outcome values.

9. The system according to claim 8 wherein the controller defines an upper limit of the prize value and receives contributions from another residual credit in another gaming system until the upper limit of the prize value is reached.

10. The system according to claim 9 wherein the controller determines the range of outcome values from the current value of the prize value.

11. The system according to claim 10 wherein the controller assigns a unique identification code for each contribution of residual credit.

12. The system according to claim 11 further comprising a storage for storing the number of winnable outcome values and the unique identification code.

13. The system according to claim 12, wherein the outcome is a first outcome, wherein the random number generator generates a second outcome and wherein the controller compares each of the first and second outcomes with the number of winnable outcome values and determines whether any of the first and second outcomes matches any winnable outcome value.

* * * * *